US012335708B2

(12) United States Patent
Ren et al.

(10) Patent No.: US 12,335,708 B2
(45) Date of Patent: Jun. 17, 2025

(54) SOUND DEVICE

(71) Applicant: AAC Microtech (Changzhou) Co., Ltd., Jiangsu (CN)

(72) Inventors: Li Ren, Changzhou (CN); Shengjie Hua, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 242 days.

(21) Appl. No.: 18/337,410

(22) Filed: Jun. 19, 2023

(65) Prior Publication Data

US 2024/0214740 A1 Jun. 27, 2024

Related U.S. Application Data

(63) Continuation of application No. PCT/CN2023/072677, filed on Jan. 17, 2023.

(30) Foreign Application Priority Data

Dec. 22, 2022 (CN) ........................ 202223467396.X

(51) Int. Cl.

| | |
|---|---|
| ***H04R 9/02*** | (2006.01) |
| ***H04R 7/04*** | (2006.01) |
| ***H04R 7/18*** | (2006.01) |
| ***H04R 9/06*** | (2006.01) |

(52) U.S. Cl.
CPC ............... *H04R 9/025* (2013.01); *H04R 7/04* (2013.01); *H04R 7/18* (2013.01); *H04R 9/06* (2013.01); *H04R 2400/11* (2013.01)

(58) Field of Classification Search
CPC . H04R 9/025; H04R 7/04; H04R 7/18; H04R 9/06; H04R 2400/11
See application file for complete search history.

(56) References Cited

FOREIGN PATENT DOCUMENTS

CN 214101779 U * 8/2021

* cited by examiner

*Primary Examiner* — Sunita Joshi
(74) *Attorney, Agent, or Firm* — Wiersch Law Group

(57) ABSTRACT

A sound device include a frame, a first vibration system, and a magnetic circuit system. The first vibration system includes a first vibrating diaphragm and a first voice coil. The magnetic circuit system includes a magnetic yoke, a main magnetic steel set, and auxiliary magnetic steel sets. One side, away from the magnetic yoke body, of each of the magnetic yoke extending portions is recessed to form positioning holes. Positioning blocks protruded from the frame are one-to-one inserted into the positioning holes for positioning, and one side, away from the magnetic yoke body, of each of the magnetic yoke extending portions at least partially abuts against the frame, so that the magnetic circuit system and the frame are assembled and positioned along a first direction and a second direction of the magnetic yoke. The sound device is easy to assemble and has excellent acoustic performance.

9 Claims, 6 Drawing Sheets

SOUND DEVICE

TECHNICAL FIELD

The present disclosure relates to a field of acoustic power, and in particular to a sound device applied to portable electronic products.

BACKGROUND

Along with arrival of mobile internet era, the number of smart mobile devices rises continuously. Among the smart mobile devices, mobile phones are undoubtedly most common and portable mobile terminal devices. Sound devices for playing sound are widely applied to conventional smart mobile devices such as the mobile phones. A vibration system and a magnetic circuit system applied to the sound devices directly affect sound quality of the sound devices.

The vibration system of the sound devices in the prior art includes a vibrating diaphragm, a voice coil, and a flexible conductive component. The vibrating diaphragm is fixed to a frame and is configured to vibrate and produce sound. The voice coil is attached to the vibrating diaphragm. The flexible conductive component is connected to the voice coil. The magnetic circuit system includes a magnetic yoke, a main magnetic steel, and two auxiliary magnetic steels. The magnetic yoke is fixed to the frame. The main magnetic steel is fixed to the magnetic yoke. The two auxiliary magnetic steels are respectively disposed on two opposite sides of the main magnetic steel. The two auxiliary magnetic steels are spaced apart from the main magnetic steel to form a magnetic gap.

However, when assembling the sound devices in the prior art, assembling the flexible conductive component, the voice coil, and the frame in a same tool, then assembling the main magnetic steel and the magnetic yoke in a same tool, and after turning over the frame, welding and fixing the magnetic yoke and the frame. The assembling sequence allows the voice coil and the frame to be assembled by using the same tool, which guarantees concentricity of the voice coil and the frame. However, subsequent welding and fixing of the magnetic yoke and the frame belong to another tool, which cannot guarantee the concentricity of the magnetic yoke and the voice coil of a previous tool, resulting in a decrease in accuracy of the concentricity of the main magnetic steel and the voice coil, affecting precision of the magnetic gaps, and resulting in low acoustic performance of the sound devices.

Therefore, it is necessary to provide a sound device to solve above technical problems.

SUMMARY

A purpose of the present disclosure is to provide a sound device that is easy to assemble and has excellent acoustic performance.

To achieve the above purpose, the present disclosure provides the sound device. The sound device include a frame, a first vibration system, and a magnetic circuit system. The first vibration system and the magnetic circuit system are fixed to the frame. The magnetic circuit system defines a first magnetic gap. The first vibration system includes a first vibrating diaphragm and a first voice coil. The first vibrating diaphragm is fixed to the frame. The first voice coil is inserted into the first magnetic gap to drive the first vibrating diaphragm to vibrate and produce sound. The magnetic circuit system includes a magnetic yoke, a main magnetic steel set, and two auxiliary magnetic steel sets, the magnetic yoke is fixed to the frame. The main magnetic steel set is fixed to the magnetic yoke. The two auxiliary magnetic steel sets are respectively disposed on a first side and a second side of the main magnetic steel set. The two auxiliary magnetic steel sets and the main magnetic steel set are spaced apart to form the first magnetic gap.

The magnetic yoke includes a magnetic yoke body and two magnetic yoke extending portions. The two magnetic yoke extending portions respectively extend from two opposite sides of the magnetic yoke body. The main magnetic steel set is fixed to one side, close to the first vibrating diaphragm, of the magnetic yoke body. The two magnetic yoke extending portions are respectively disposed on a third side and a fourth side of the main magnetic steel set.

One side, away from the magnetic yoke body, of each of the magnetic yoke extending portions is recessed towards a direction of the magnetic yoke body to form positioning holes. The frame is annular. Positioning blocks are disposed on the frame. The positioning blocks protrude from an inner side of the frame. The positioning blocks are one-to-one matched with the positioning holes.

The positioning blocks are one-to-one inserted into the positioning holes for positioning, so that the magnetic circuit system and the frame are assembled and positioned along a first direction of the magnetic yoke. The one side, away from the magnetic yoke body, of each of the magnetic yoke extending portions at least partially abuts against the inner side of the frame, so that the magnetic circuit system and the frame are assembled and positioned along a second direction of the magnetic yoke. The first direction and the second direction are perpendicular to each other and are parallel to the magnetic yoke body.

Optionally, each of the magnetic yoke extending portions includes a first section and a second section. Each first section is bent and extends from the magnetic yoke body to a direction of the first vibrating diaphragm. Each second section is bent and extends from a corresponding first section to a direction of the frame. Each second section defines corresponding positioning holes. The main magnetic steel set is spaced apart from the two auxiliary magnetic steel sets and first sections. The main magnetic steel set, the two auxiliary magnetic steel sets, and first sections enclose to define the first magnetic gap.

Optionally, each of the magnetic yoke extending portions further includes a third section. Each third section is protruded from a corresponding second section to a direction away from the magnetic yoke body. The frame further includes accommodating grooves. The frame is recessed to form the accommodating grooves.

Each third section is accommodated in a corresponding accommodating groove. A side wall, close to a corresponding auxiliary magnetic steel set, of each third section abuts against a side wall of the corresponding accommodating groove, so that the magnetic circuit system and the frame are assembled and positioned along the first direction of the magnetic yoke.

Optionally, a side wall of each of the positioning holes connected to a corresponding third section and a side wall of the corresponding third section are flush and enclose to form a first connecting wall. A side wall of each of the accommodating grooves assembled with a corresponding positioning block and a side wall of the corresponding positioning block are flush and enclose to form a second connecting wall. Each first connecting wall abuts against a corresponding second connecting wall, so that the magnetic circuit system and the frame are assembled and positioned along the first direction of the magnetic yoke.

Optionally, there are four positioning holes. Every two positioning holes are formed in a same second section at intervals. Each third section is located between the two positioning holes in a same side of each second section. A portion, abutting against the inner side of the frame, of each second section is located between a corresponding positioning hole and a corner portion of one second section adjacent to the corresponding positioning hole.

Optionally, each of the magnetic yoke extending portions further includes a plurality of protruding blocks. The plurality of protruding blocks protrude from one side, away from the first vibrating diaphragm, of each of the magnetic yoke extending portions. The plurality of protruding blocks are respectively disposed on each second section and/or each third section. The plurality of protruding blocks are disposed in an array.

Optionally, the frame includes a first frame and a second frame; the first frame is stacked on the second frame. The first frame and the second frame form a fixing structure. The first vibrating diaphragm is fixed to the first frame. Each second section is fixed to the first frame. The positioning blocks are disposed on the first frame.

Optionally, the sound device includes a second vibration system. The second vibration system is fixed to the second frame. The first vibration system and the second vibration system are respectively disposed on two opposite sides of the magnetic circuit system along a vibration direction of the first vibrating diaphragm.

The second vibration system includes a second vibrating diaphragm and a second voice coil. The second vibrating diaphragm is fixed to the second frame. The second voice coil is configured to drive the second vibrating diaphragm to vibrate and produce sound. A second auxiliary pole core is disposed on one side, away from the first vibrating diaphragm, of each of the auxiliary magnetic steel sets. Each second auxiliary pole core is annular and is fixed to the second frame. Second auxiliary pole cores surround the magnetic yoke body at intervals. The second auxiliary pole cores and the magnetic yoke body enclose to form a second magnetic gap. The second magnetic gap is spaced apart from the first magnetic gap. The second magnetic gap surrounds the first magnetic gap. The second voice coil is inserted into the second magnetic gap.

Optionally, the main magnetic steel set includes a first main magnetic steel, a second main magnetic steel, and a main pole core. The first main magnetic steel is fixed to the one side, close to the first vibrating diaphragm, of the magnetic yoke body. The second main magnetic steel is stacked on and fixed to the first main magnetic steel. The main pole core is stacked on the second main magnetic steel. Each of the auxiliary magnetic steel sets includes an auxiliary magnetic steel, a first auxiliary pole core, and the second auxiliary pole core. Each first auxiliary pole core and each second auxiliary pole core are respectively stacked on two opposite sides of each auxiliary magnetic steel. Each first auxiliary pole core is located on one side, close to the first vibrating diaphragm, of each auxiliary magnetic steel. Each second auxiliary pole core is disposed on one side, close to the second vibrating diaphragm, of each auxiliary magnetic steel.

Compared with the prior art, in the present disclosure, the magnetic yoke includes the magnetic yoke body and two magnetic yoke extending portions. The two magnetic yoke extending portions respectively extend from two opposite sides of the magnetic yoke body. The one side, away from the magnetic yoke body, of each of the magnetic yoke extending portions, is recessed towards a direction of the magnetic yoke body to form the positioning holes. The positioning blocks are disposed on the frame. The positioning blocks protrude from the inner side of the frame. The positioning blocks are one-to-one matched with the positioning holes. The positioning blocks are one-to-one inserted into the positioning holes for positioning, so that the magnetic circuit system and the frame are assembled and positioned along the first direction of the magnetic yoke. The one side, away from the magnetic yoke body, of each of the magnetic yoke extending portions at least partially abuts against the inner side of the frame, so that the magnetic circuit system and the frame are assembled and positioned along the second direction of the magnetic yoke. On a basis that the main magnetic steel set is fixed on the magnetic yoke body, when the magnetic yoke is assembled with the frame, the positioning blocks are one-to-one connected with the positioning holes for stably fixing the magnetic yoke to the frame. The assembling method avoids a situation that when assembling a sound device in the prior art, the frame is turned over first and then the magnetic yoke and the frame is assembled. Compared with the sound device in the prior art, the sound device of the present disclosure is easier to assemble. Furthermore, structures of the magnetic yoke and the frame ensure concentricity between the magnetic yoke and the frame, making the concentricity between the first voice coil and the main magnetic steel set good, improving an accuracy of the first magnetic gap improves, and improving performance of a sound pressure level (SPL), so that the acoustic performance of the sound device is good.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Figure 1:
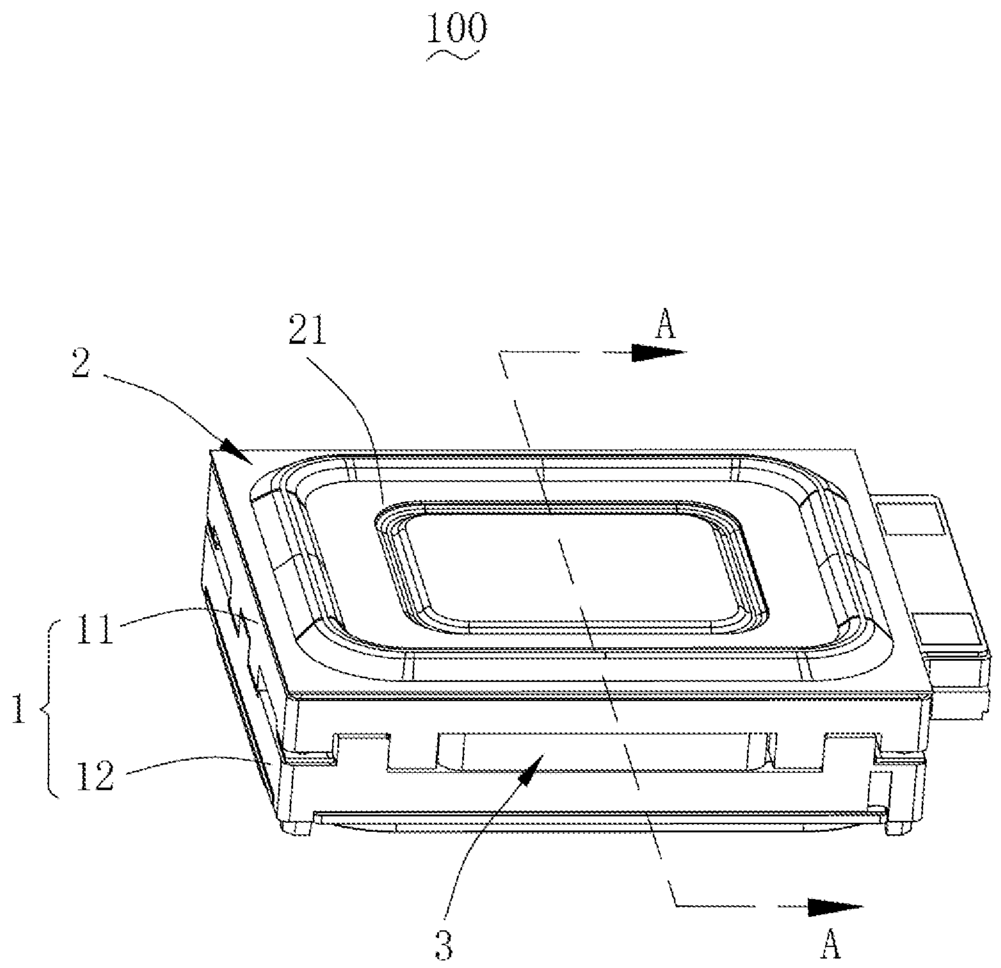
FIG. 1 is a perspective schematic diagram of a sound device of the present disclosure.
Figure 2:
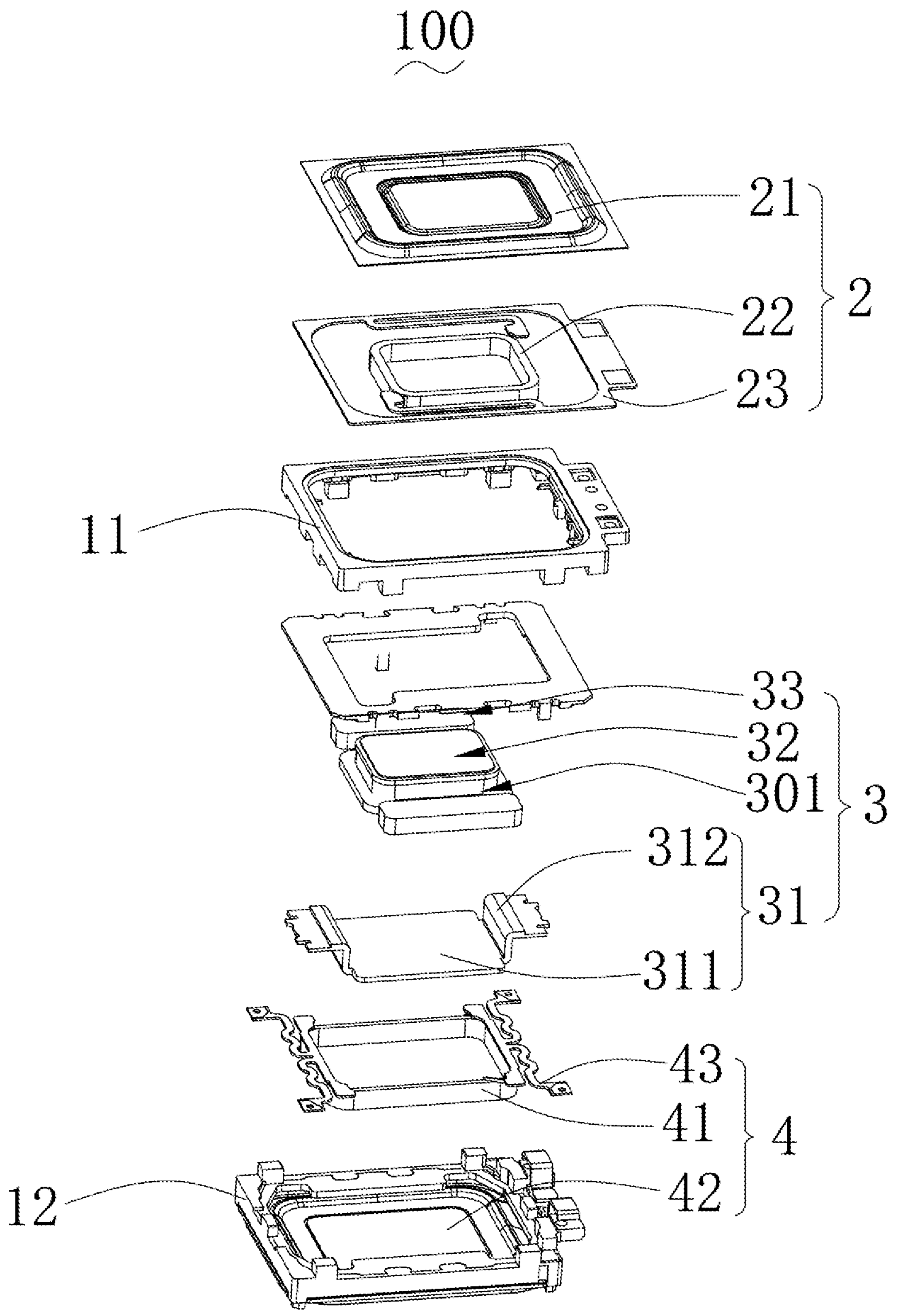
FIG. 2 is an exploded perspective schematic diagram of a part of the sound device of the present disclosure.
Figure 3:
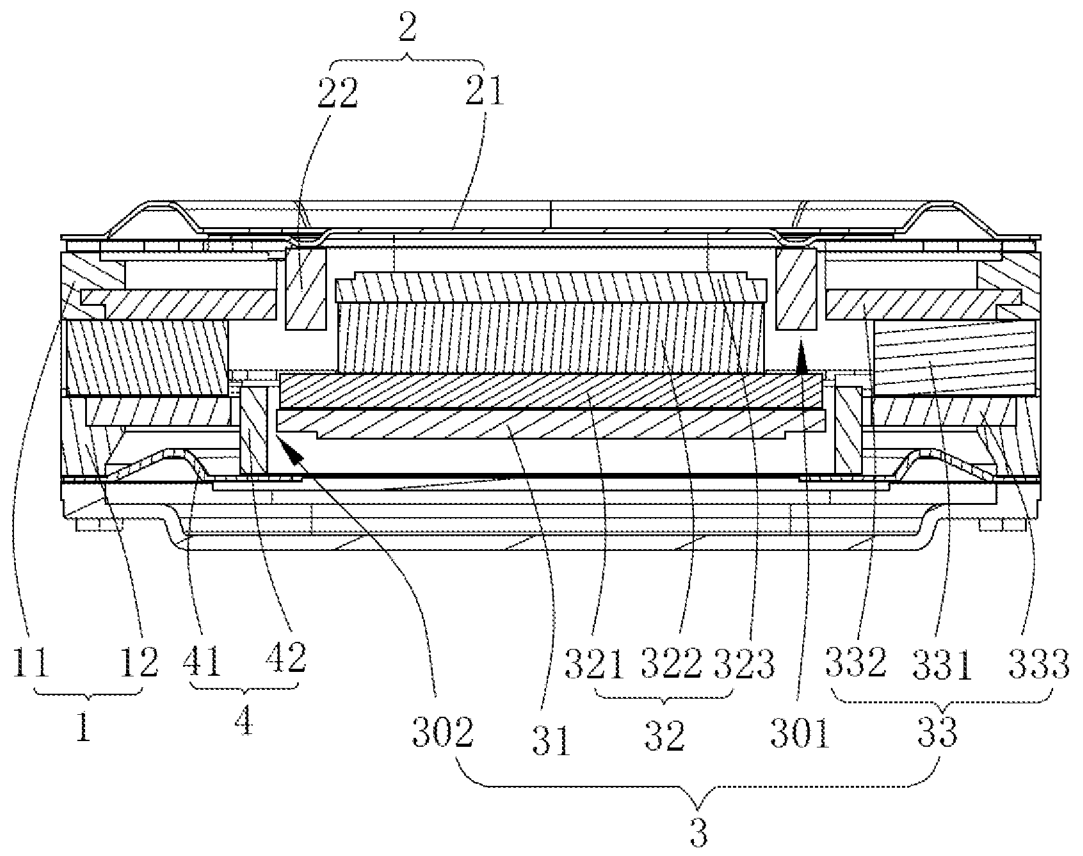
FIG. 3 is a cross-sectional schematic diagram taken along the line A-A.
Figure 4:
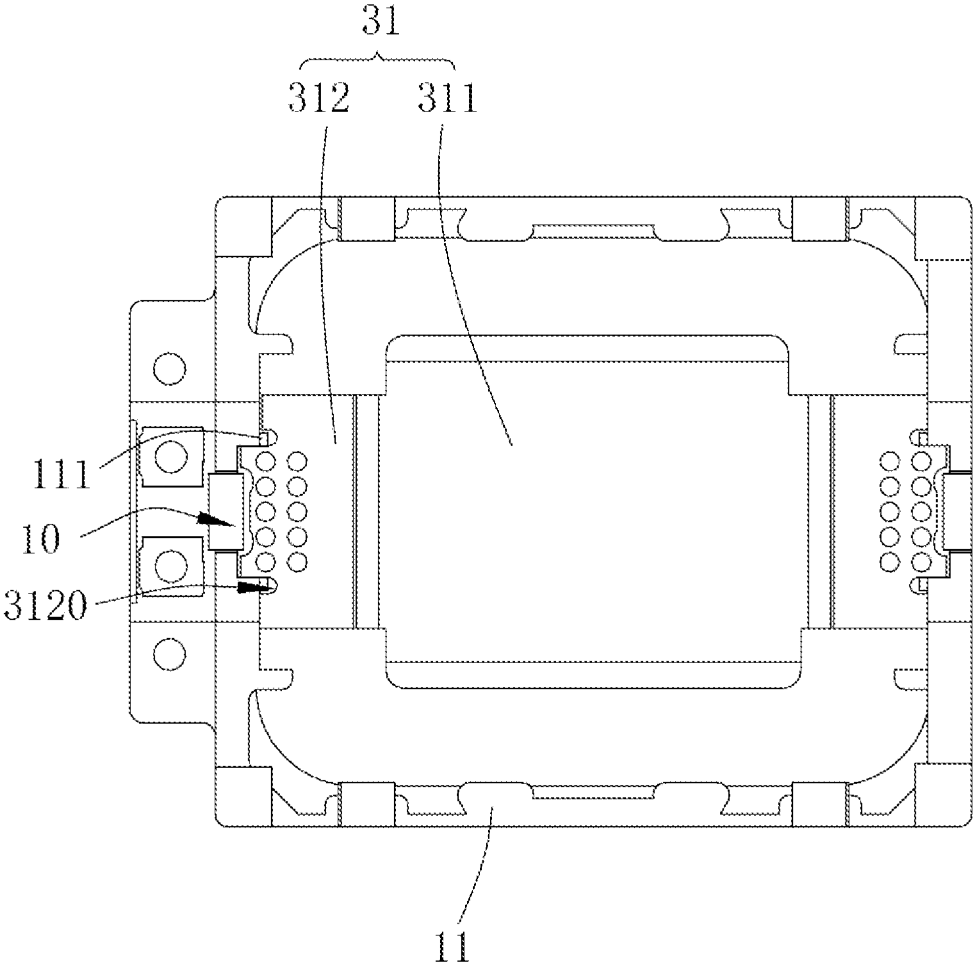
FIG. 4 is a schematic diagram of a magnetic yoke and a frame of the sound device of the present disclosure where the magnetic yoke is assembled with the frame.
Figure 5:
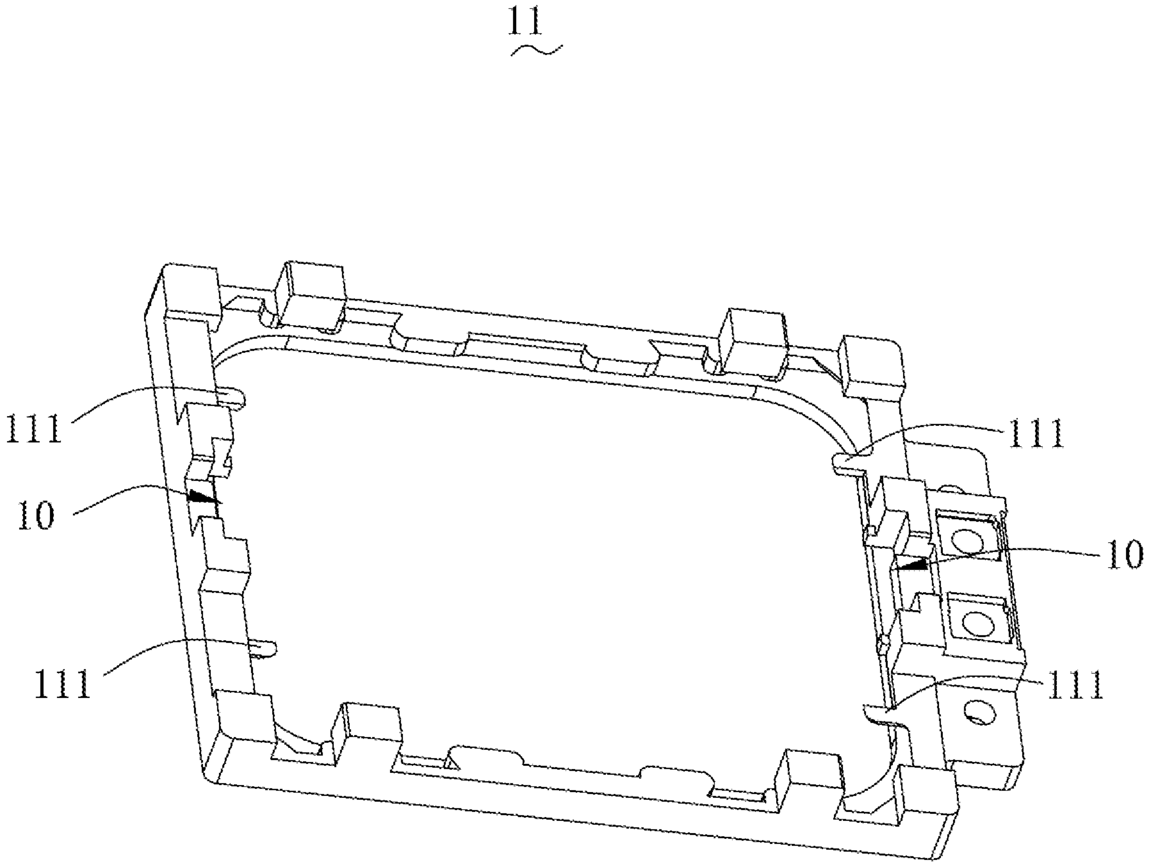
FIG. 5 is a perspective schematic diagram of a first frame of the sound device of the present disclosure.
Figure 6:
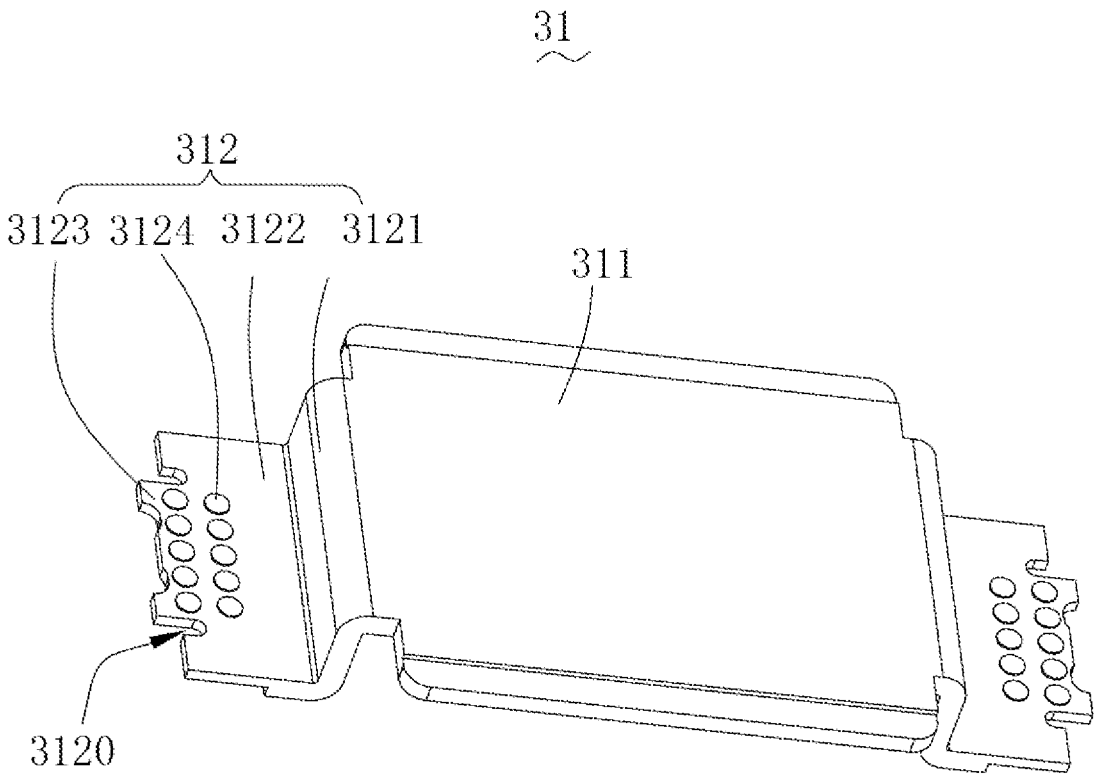
FIG. 6 is a perspective schematic diagram of the magnetic yoke of the sound device of the present disclosure.

As shown in FIGS. 1-6, the present disclosure provides a sound device 100.

Specifically, the sound device 100 include a frame 1, a first vibration system 2, a magnetic circuit system 3, and a second vibration system 4. The first vibration system 2, the magnetic circuit system 3, and the second vibration system 4 are fixed to the frame 1.

The magnetic circuit system 3 defines a first magnetic gap 301 and a second magnetic gap 302. The second magnetic gap 302. is spaced apart from the first magnetic gap 301, and the second magnetic gap 302 surrounds the first magnetic gap 301.

The frame 1 is annular. Positioning blocks 111 are disposed on the frame 1. The positioning blocks 111 protrude from an inner side of the frame 1. The positioning blocks 111 are configured to position with the magnetic circuit system 3, during assembly.

In the embodiment, the frame 1 includes a first frame 11 and a second frame 12. The first frame 11 is stacked on the second frame 12. The first frame and the second frame form a fixing structure. The positioning blocks 111 are disposed on the first frame 11. The frame 1 is divided into separate structures of the first frame 11 and the second frame 12, which facilitates assembly of the sound device 100. Of course, it is also possible to set the frame 1 as an integral structure.

The first vibration system 2 includes a first vibrating diaphragm 21, a first voice coil 22, and a first flexible conductive piece 23. The first vibrating diaphragm 21 is fixed to the frame 1. The first voice coil 22 is inserted into the first magnetic gap 301 to drive the first vibrating diaphragm 21 to vibrate and produce sound. The first flexible conductive piece 23. is connected to the first voice coil 22. Two ends of the first flexible conductive piece 23 are respectively fixed to the first voice coil 22 and the first frame 11. The first flexible conductive piece 23 is electrically connected to the first voice coil 22. Specifically, the first flexible conductive piece 23 is electrically connected to a first lead wire of the first voice coil 22.

In the embodiment, the first diaphragm 21 is fixed to the first frame 11. When assembling, the first vibration system 2 and the first frame 1 are firstly fixed, so that concentricity between the first voice coil 22 and the first frame 11 is good.

The first vibration system 2 and the second vibration system 4 are respectively disposed on two opposite sides of the magnetic circuit system 3 along a vibration direction of the first vibrating diaphragm 21. The second vibration system 4 is fixed to the second frame 12.

The second vibration system 4 includes a second vibrating diaphragm 41, a second voice coil 42, and a second conductive piece 43. The second vibrating diaphragm 41 is fixed to the second frame 12. The second voice coil 42 is configured to drive the second vibrating diaphragm 41 to vibrate and produce sound. The second flexible conductive piece 43. is connected to the second voice coil 42. The second voice coil 42 is inserted into the second magnetic gap 302 to drive the second vibrating diaphragm to vibrate and produce sound. Two ends of the second flexible conductive piece 43 are respectively fixed to the second voice coil 42 and the second frame 12. The second flexible conductive piece 43 is electrically connected to the second voice coil 42. Specifically, the second flexible conductive piece 43 is electrically connected to a second lead wire of the second voice coil 42.

The magnetic circuit system 3 includes a magnetic yoke 31, a main magnetic steel set 32, and two auxiliary magnetic steel sets 33. The magnetic yoke 31 is fixed to the frame 1. The main magnetic steel set 32 is fixed to the magnetic yoke 31. The two auxiliary magnetic steel sets 33 are respectively disposed on a first side and a second side of the main magnetic steel set 32. The two auxiliary magnetic steel sets 33 and the main magnetic steel set 32 are spaced apart to form the first magnetic gap 301.

The magnetic yoke 31 includes a magnetic yoke body 311 and two magnetic yoke extending portions 312. The two magnetic yoke extending portions 312 respectively extend from two opposite sides of the magnetic yoke body 311. The main magnetic steel set 32 is fixed to one side, close to the first vibrating diaphragm 21, of the magnetic yoke body 311.

The two magnetic yoke extending portions 312 are respectively disposed on a third side and a fourth side of the main magnetic steel set 32.

One side, away from the magnetic yoke body, of each of the magnetic yoke extending portions 312 is recessed towards a direction of the magnetic yoke body 311 to form positioning holes 3120. The positioning blocks 111 are one-to-one matched with the positioning holes 3120.

The positioning blocks 111 are one-to-one inserted into the positioning holes 3120 for positioning, so that the magnetic circuit system 3 and the frame 1 are assembled and positioned along a first direction of the magnetic yoke 31. The one side, away from the magnetic yoke body 311, of each of the magnetic yoke extending portions 312 at least partially abuts against the inner side of the frame 1, so that the magnetic circuit system 3 and the frame 1 are assembled and positioned along a second direction of the magnetic yoke 31. The first direction and the second direction are perpendicular to each other and are parallel to the magnetic yoke body 311.

The magnetic yoke 31 and the frame 1 are respectively positioned in the first direction and the second direction of the magnetic yoke 31, so that after the assembly is completed, a relative position between the magnetic yoke 31 and the frame 1 is accurately fixed. Since the main magnetic steel set 32 is fixed on the magnetic yoke body 311, a relative positions between the main magnetic steel set 32 and the frame 1 is accurately fixed. Since the first voice coil 22 and the frame 1 are assembled and fixed, the main magnetic steel set 32 and the first voice coil 22 are accurately assembled. That is, the concentricity of the main magnetic steel set 32 and the first voice coil 22 is good, so that a size of the first magnetic gap 301 is reduced, thereby improving performance of a sound pressure level (SPL) and making acoustic performance of the sound device 100 good.

Specifically, each of the magnetic yoke extending portions 312 includes a first section 3121, a second section 3122, and a section 3123. Each first section is bent and extends from the magnetic yoke body 311 to a direction of the first vibrating diaphragm 21. Each second section 3122 is bent and extends from a corresponding first section 3121 to a direction of the frame 1. Each third section is protruded from a corresponding second section to a direction away from the magnetic yoke body 311. The second voice coil 42 is spaced apart from and surrounds each first section 3121. Each second section 3122 is fixed to the first frame 11.

Each second section 3122 defines corresponding positioning holes 3120. In the embodiment, there are four positioning holes 3120. Every two positioning holes 3120 are formed in a same second section 3122 at intervals. Each third section 3123 is located between the two positioning holes 3120 in a same side of each second section 3122.

A portion, abutting against the inner side of the frame, of each second section 3122 is located between a corresponding positioning hole 3120 and a corner portion of one second section 3122 adjacent to the corresponding positioning hole 3120.

The frame 1 further includes accommodating grooves 10. The frame 1 is recessed to form the accommodating grooves 10. Each third section 3123 is accommodated in a corresponding accommodating groove 10. A side wall, close to a corresponding auxiliary magnetic steel set 33, of each third section 3123 abuts against a side wall of the corresponding accommodating groove 10, so that the magnetic circuit system 3 and the frame 1 are assembled and positioned along the first direction of the magnetic yoke 31.

A side wall of each third section 3123 close to a corresponding auxiliary magnetic steel set 33 abuts against a side wall of a corresponding accommodating groove 10, so that the magnetic circuit system 3 and the frame 1 are assembled and positioned in the first direction of the magnetic yoke 31. Each third section 3123 is positioned by the side wall of the corresponding accommodating groove 10. Each third section 3123, the corresponding accommodating groove 10 are positioned with corresponding positioning blocks 111 and corresponding positioning holes 3120 during assembly, so that the frame and the magnetic circuit system 3 are easy to assemble, the assembly accuracy is improved, and the acoustic performance of the sound device 100 is good.

In the embodiment, the side wall of each of the positioning holes 3120 connected to a corresponding third section 3123 and a side wall of the corresponding third section 3123 are flush and enclose to form a first connecting wall. A side wall of each of the accommodating grooves 10 assembled with a corresponding positioning block and a side wall of the corresponding positioning block are flush and enclose to form a second connecting wall. Each first connecting wall abuts against a corresponding second connecting wall, so that the magnetic circuit system 3 and the frame 1 are assembled and positioned along the first direction of the magnetic yoke 31. Therefore, the frame and the magnetic circuit system 3 are easy to assemble, the assembly accuracy is improved, and the acoustic performance of the sound device 100 is good.

In the embodiment, each of the magnetic yoke extending portions 312 further includes a plurality of protruding blocks 3124. The plurality of protruding blocks 3124 protrude from one side, away from the first vibrating diaphragm 21, of each of the magnetic yoke extending portions 312. The plurality of protruding blocks 3124 are respectively disposed on each second section 3122 and/or each third section 3123. The plurality of protruding blocks 3124 are disposed in an array. The plurality of protruding blocks 33124 facilitate the assembly of the magnetic yoke 31 and the frame 1, and prevent the magnetic yoke 31 from slipping during assembly, so that the magnetic yoke 31 is not damaged during assembly.

The main magnetic steel set 32 is spaced apart from the two auxiliary magnetic steel sets 33 and first sections 3121. The main magnetic steel set 32, the two auxiliary magnetic steel sets 33, and first sections 3121 enclose to define the first magnetic gap 301.

The main magnetic steel set 32 includes a first main magnetic steel 321, a second main magnetic steel 322, and a main pole core 323. The first main magnetic steel 321 is fixed to the one side, close to the first vibrating diaphragm 21, of the magnetic yoke body. The second main magnetic steel 322 is stacked on and fixed to the first main magnetic steel 321. The main pole core 323 is stacked on the second main magnetic steel 322.

Each of the auxiliary magnetic steel sets 33 includes an auxiliary magnetic steel 331, a first auxiliary pole core 332, and the second auxiliary pole core 333. Each first auxiliary pole core 332 and each second auxiliary pole core 333 are respectively stacked on two opposite sides of each auxiliary magnetic steel 331. Each first auxiliary pole core 332 is located on one side, close to the first vibrating diaphragm 21, of each auxiliary magnetic steel 331. Each second auxiliary pole core 333 is disposed on one side, close to the second vibrating diaphragm 41, of each auxiliary magnetic steel 331. Each second auxiliary pole core 333 is fixed to the second frame 12.

The second main magnetic steel 322 and the main pole core 323 are spaced apart from and enclosed with auxiliary magnetic steels 331 and first auxiliary pole cores 332 to form the first magnetic gap 301.

The main magnetic steel set 32 is spaced apart from the auxiliary magnetic steel sets 33 to form the second magnetic gap 302. Specifically, second auxiliary pole cores 333 surround the magnetic yoke body 311 at intervals. The second auxiliary pole cores 333 and the magnetic yoke body 31 enclose to form the second magnetic gap 302.

Compared with the prior art, in the present disclosure, the magnetic yoke includes the magnetic yoke body and two magnetic yoke extending portions. The two magnetic yoke extending portions respectively extend from two opposite sides of the magnetic yoke body. The one side, away from the magnetic yoke body, of each of the magnetic yoke extending portions, is recessed towards a direction of the magnetic yoke body to form the positioning holes. The positioning blocks are disposed on the frame. The positioning blocks protrude from the inner side of the frame. The positioning blocks are one-to-one matched with the positioning holes. The positioning blocks are one-to-one inserted into the positioning holes for positioning, so that the magnetic circuit system and the frame are assembled and positioned along the first direction of the magnetic yoke. The one side, away from the magnetic yoke body, of each of the magnetic yoke extending portions at least partially abuts against the inner side of the frame, so that the magnetic circuit system and the frame are assembled and positioned along the second direction of the magnetic yoke. On a basis that the main magnetic steel set is fixed on the magnetic yoke body, when the magnetic yoke is assembled with the frame, the positioning blocks are one-to-one connected with the positioning holes for stably fixing the magnetic yoke to the frame. The assembling method avoids a situation that when assembling a sound device in the prior art, the frame is turned over first and then the magnetic yoke and the frame is assembled. Compared with the sound device in the prior art, the sound device of the present disclosure is easier to assemble. Furthermore, structures of the magnetic yoke and the frame ensure the concentricity between the magnetic yoke and the frame, making the the concentricity between the first voice coil and the main magnetic steel set good, improving an accuracy of the first magnetic gap improves, and improving the performance of the SPL, so that the acoustic performance of the sound device is good.

The above are only the embodiments of the present disclosure. It should be pointed out that for those of ordinary skill in the art, improvements can be made without departing from the inventive concept of the present disclosure, and these improvements fall within the protection scope of the present disclosure.

What is claimed is:

1. A sound device, comprising:

a frame;

a first vibration system; and
a magnetic circuit system;
wherein the first vibration system and the magnetic circuit system are fixed to the frame; the magnetic circuit system defines a first magnetic gap; the first vibration system comprises a first vibrating diaphragm and a first voice coil; the first vibrating diaphragm is fixed to the frame; the first voice coil is inserted into the first magnetic gap to drive the first vibrating diaphragm to vibrate and produce sound; the magnetic circuit system comprises a magnetic yoke, a main magnetic steel set, and two auxiliary magnetic steel sets; the magnetic yoke is fixed to the frame; the main magnetic steel set is fixed to the magnetic yoke; the two auxiliary magnetic steel sets are respectively disposed on a first side and a second side of the main magnetic steel set; the two auxiliary magnetic steel sets and the main magnetic steel set are spaced apart to form the first magnetic gap;
the magnetic yoke comprises a magnetic yoke body and two magnetic yoke extending portions; the two magnetic yoke extending portions respectively extend from two opposite sides of the magnetic yoke body; the main magnetic steel set is fixed to one side, close to the first vibrating diaphragm, of the magnetic yoke body; and the two magnetic yoke extending portions are respectively disposed on a third side and a fourth side of the main magnetic steel set;
one side, away from the magnetic yoke body, of each of the magnetic yoke extending portions is recessed towards a direction of the magnetic yoke body to form positioning holes; the frame is annular, positioning blocks are disposed on the frame; the positioning blocks protrude from an inner side of the frame; the positioning blocks are one-to-one matched with the positioning holes; and
the positioning blocks are one-to-one inserted into the positioning holes for positioning, so that the magnetic circuit system and the frame are assembled and positioned along a first direction of the magnetic yoke; the one side, away from the magnetic yoke body, of each of the magnetic yoke extending portions, at least partially abuts against the inner side of the frame, so that the magnetic circuit system and the frame are assembled and positioned along a second direction of the magnetic yoke; the first direction and the second direction are perpendicular to each other and are parallel to the magnetic yoke body.

2. The sound device according to claim 1, wherein each of the magnetic yoke extending portions comprises a first section and a second section; each first section is bent and extends from the magnetic yoke body to a direction of the first vibrating diaphragm; each second section is bent and extends from a corresponding first section to a direction of the frame; each second section defines corresponding positioning holes; the main magnetic steel set is spaced apart from the two auxiliary magnetic steel sets and first sections; the main magnetic steel set, the two auxiliary magnetic steel sets, and first sections enclose to define the first magnetic gap.

3. The sound device according to claim 2, wherein each of the magnetic yoke extending portions further comprises a third section; each third section is protruded from a corresponding second section to a direction away from the magnetic yoke body; the frame further comprises accommodating grooves; the frame is recessed to form the accommodating grooves; each third section is accommodated in a corresponding accommodating groove; a side wall, close to a corresponding auxiliary magnetic steel set, of each third section abuts against a side wall of the corresponding accommodating groove, so that the magnetic circuit system and the frame are assembled and positioned along the first direction of the magnetic yoke.

4. The sound device according to claim 3, wherein a side wall of each of the positioning holes connected to a corresponding third section and a side wall of the corresponding third section are flush and enclose to form a first connecting wall; a side wall of each of the accommodating grooves assembled with a corresponding positioning block and a side wall of the corresponding positioning block are flush and enclose to form a second connecting wall, and each first connecting wall abuts against a corresponding second connecting wall, so that the magnetic circuit system and the frame are assembled and positioned along the first direction of the magnetic yoke.

5. The sound device according to claim 4, wherein there are four positioning holes, every two positioning holes are formed in a same second section at intervals;
each third section is located between the two positioning holes in a same side of each second section; and a portion, abutting against the inner side of the frame, of each second section is located between a corresponding positioning hole and a corner portion of one second section adjacent to the corresponding positioning hole.

6. The sound device according to claim 3, wherein each of the magnetic yoke extending portions further comprises a plurality of protruding blocks; the plurality of protruding blocks protrude from one side, away from the first vibrating diaphragm, of each of the magnetic yoke extending portions; the plurality of protruding blocks are respectively disposed on each second section and/or each third section; and the plurality of protruding blocks are disposed in an array.

7. The sound device according to claim 2, wherein the frame comprises a first frame and a second frame; the first frame is stacked on the second frame; the first frame and the second frame form a fixing structure; the first vibrating diaphragm is fixed to the first frame; each second section is fixed to the first frame; and the positioning blocks are disposed on the first frame.

8. The sound device according to claim 7, wherein the sound device comprises a second vibration system; the second vibration system is fixed to the second frame; the first vibration system and the second vibration system are respectively disposed on two opposite sides of the magnetic circuit system along a vibration direction of the first vibrating diaphragm; the second vibration system comprises a second vibrating diaphragm and a second voice coil; the second vibrating diaphragm is fixed to the second frame, the second voice coil is configured to drive the second vibrating diaphragm to vibrate and produce sound; a second auxiliary pole core is disposed on one side, away from the first vibrating diaphragm, of each of the auxiliary magnetic steel sets; each second auxiliary pole core is annular and is fixed to the second frame; second auxiliary pole cores surround the magnetic yoke body at intervals; the second auxiliary pole cores and the magnetic yoke body enclose to form a second magnetic gap; the second magnetic gap is spaced apart from the first magnetic gap; the second magnetic gap surrounds the first magnetic gap; the second voice coil is inserted into the second magnetic gap.

9. The sound device according to claim 8, wherein the main magnetic steel set comprises a first main magnetic steel, a second main magnetic steel, and a main pole core; the first main magnetic steel is fixed to the one side, close to the first vibrating diaphragm, of the magnetic yoke body; the second main magnetic steel is stacked on and fixed to the first main magnetic steel; the main pole core is stacked on the second main magnetic steel; each of the auxiliary magnetic steel sets comprises an auxiliary magnetic steel, a first auxiliary pole core, and the second auxiliary pole core; each first auxiliary pole core and each second auxiliary pole core are respectively stacked on two opposite sides of each auxiliary magnetic steel, each first auxiliary pole core is located on one side, close to the first vibrating diaphragm, of each auxiliary magnetic steel; each second auxiliary pole core is disposed on one side, close to the second vibrating diaphragm, of each auxiliary magnetic steel.

* * * * *